United States Patent [19]  
Riddle

[11] 4,366,563  
[45] Dec. 28, 1982

[54] VIDEO DISC STYLUS SUSPENSION APPARATUS

[75] Inventor: George H. N. Riddle, Princeton, N.J.

[73] Assignee: RCA Corporation, New York, N.Y.

[21] Appl. No.: 238,983

[22] Filed: Feb. 27, 1981

[51] Int. Cl.³ .......................... G11B 11/00; G11B 3/10
[52] U.S. Cl. ...................................... 369/43; 369/170
[58] Field of Search ................ 369/43, 126, 139, 170, 369/247, 220

[56] References Cited

U.S. PATENT DOCUMENTS 3,711,641  1/1973  Palmer ............................. 358/128.6
3,842,194 10/1974  Clemens ............................ 369/129
4,037,253  7/1977  Nagaoka ............................ 369/130
4,040,635  8/1977  Leedom ............................. 369/170
4,124,217 11/1978  Tajima ............................. 369/151
4,150,395  4/1979  Pritchard .......................... 358/8
4,170,783 10/1979  Tajima ............................. 369/43
4,183,059  1/1980  Palmer ............................. 360/10

Primary Examiner—Alan Faber  
Attorney, Agent, or Firm—E. M. Whitacre; J. S. Tripoli; E. P. Herrmann

[57] ABSTRACT

A system for suspending a video disc signal pickup stylus arm incorporated with a permanent magnet which is part of a motive means for providing stylus-disc velocity corrections. The permanent magnet is constraind in a flexible "H" shaped suspension to maintain the magnet in a fixed orientation while undergoing translation. The stylus arm is compliantly coupled to the "H" shaped suspension colinear with the magnet. Off axis forces on the magnet are precluded from imparting off axis forces to the stylus arm, thereby eliminating the stimuli which create mechanical resonances in the stylus arm.

13 Claims, 5 Drawing Figures

VIDEO DISC STYLUS SUSPENSION APPARATUS

This invention relates to video disc player apparatus and more particularly to apparatus for suspending the signal pickup stylus support member in such fashion to reduce the mechanical resonance in the support member.

BACKGROUND OF THE INVENTION

In certain video disc systems, information is recorded as geometric variations within spiral or circular information tracks in the surface of a disc record. A signal pickup stylus engages the track and cooperating with signal pickup circuitry, recovers the recorded information as an electrical manifestation thereof. These recovery systems may be of the capacitive type as described in U.S. Pat. No. 3,842,194 Clemens or the pressure sensitive type as indicated in U.S. Pat. No. 4,037,253—Nagaoka. In either system, the information tracks and the recorded information therein is in an extremely high density format in order to engraft an acceptable amount of information on a single record. The resultant spatial dimensions of both the tracks and the geometric variations constituting signal within the tracks are in the order of micrometers and tenths of micrometers, respectively.

During signal recovery, relative velocity is created between the signal pickup stylus and the signal variations, i.e., the disc record, by rotating the disc at a prescribed velocity. Variations from the prescribed or desired stylus-disc relative velocity result in undesired distortion in the recovered signal. Velocity variations as small as 0.01 percent will noticeably affect video picture quality, which variations typically originate from track eccentricity, disc warp, disc pressing distortions, recording errors, turntable eccentricities, etc. Due to the relatively high frequency of velocity deviations and relatively large mass and high speed of rotation, e.g., 450 RPM, of the player turntable, it is not feasible to correct for stylus-disc velocity variations by actively controlling the turntable speed. Velocity correction has therefore been performed either electrically as in U.S. Pat. No. 4,150,395—Pritchard or by translating the stylus along the information track by means of a servo system, see for example, U.S. Pat. No. 3,711,641—Palmer.

In the foregoing Palmer type system, the signal pickup stylus is secured to a stylus arm arranged substantially tangent to the track being currently engaged. A second end of the stylus arm is connected to an electromechanical transducer for producing longitudinal motion in the stylus arm and thus, a translation in the stylus arm along the track. The transducer is responsive to signal derived from the signal recovered from the record and indicative of relative stylus-disc velocity errors. This signal conditions the transducer to move the stylus/stylus arm in the direction of disc rotation to reduce the relative disc-stylus velocity and move the arm opposite the disc rotation to increase the relative velocity.

U.S. Pat. No. 4,170,783—Tajima illustrates another arrangement wherein a permanent magnet is secured to the end of the stylus arm distant from the pickup stylus and electromagnetic coils are disposed proximate the permanent magnet to influence the position of the magnet through mutual coupling of magnetic fields and thereby influence the stylus-disc relative velocity responsive to correction signals.

The present inventor discovered that improper alignment of the permanent magnet with the stylus arm, and improper positioning and orientation of the permanent magnet with respect to the coils will produce additional disc-stylus velocity errors as a result of the stylus arm "fishpoling". Fishpoling is defined as the condition of flexure wherein the center of a longitudinal member moves in one direction normal to its longitudinal axis and its ends move in the opposite direction. It is believed that the motion is excited by off axis force components imparted by the transducer coils to the magnet secured to the stylus arm. If the stylus tip is constrained to remain on the disc (e.g., by a leafspring flylead) the stylus pickup electrode on one facet thereof tends to move forward along the information track as the stylus holder tilts back, i.e., as the stylus arm bows toward the disc record, and tends to move backward along the track as the stylus arm bows upward away from the disc record. The stylus-disc velocity errors due to this flexure become particularly accentuated if the stylus arm is excited to bow or flex in one of its resonant modes, causing the stylus translation to become exaggerated. Higher harmonics of the resonant flexure have been observed as well. The stylus positional response of the stylus arm first harmonic is antiphase with the fundamental response while the second harmonic response is in phase. Harmonics above the second generally require stimulus at a frequency too high to be of concern. The magnitude of the resonant modes depends on details of the stylus arm structure, particularly the arm shaft diameter, length and mass. One particular hollow aluminum stylus arm 0.1 cm in diameter and 6.25 cm long consistently indicated a fundamental mode occurring at a stimulating frequency of 250–300 Hz, a first harmonic at 500–600 Hz and a further harmonic or peak between 900–1500 Hz.

Careful alignment of the permanent magnet with the stylus, so that off axis force components are substantially eliminated, significantly reduces stylus arm flexure or fishpoling. One method of attaining such alignment is to form the permanent magnet with a hole therethrough for coaxial mounting directly to the stylus arm. Unfortunately, as the stylus translates normal or parallel to the disc surface respectively due to disc warp or track eccentricity, etc., the stylus arm can pivot about its supporting elements tending to misalign the permanent magnet with its driving coils creating an off axis force component and thereby creating a stimulus for fishpoling.

BRIEF SUMMARY OF THE INVENTION

The present invention provides a stylus arm suspension for accepting a permanent magnet and securing it at a constant orientation with an associative electromagnetic coil. The suspension comprises two parallel horizontal ribbon members elastically stretched between fixed supporting posts so that the faces of the ribbons lie in planes substantially normal to the stylus arm. A central member having a cavity therein is disposed between the ribbons at their midpoints and with the cavity coaxially aligned with the stylus arm. The cavity is configured to securely receive therein at least a portion of a permanent magnet, at least one pole of the magnet being proximate a fixed coil in a prescribed orientation. A compliant coupler, secured to one of the ribbons, couples the stylus arm thereto in a prescribed alignment with the magnet, which compliant coupler provides limited pivotal movement of the stylus arm without affecting the magnet-coil relationship.

Figure 3:
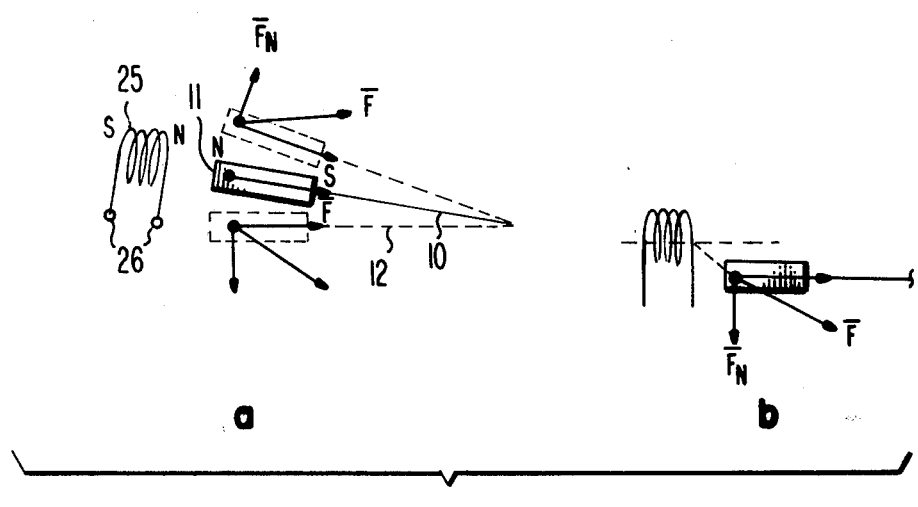
Figure 4:
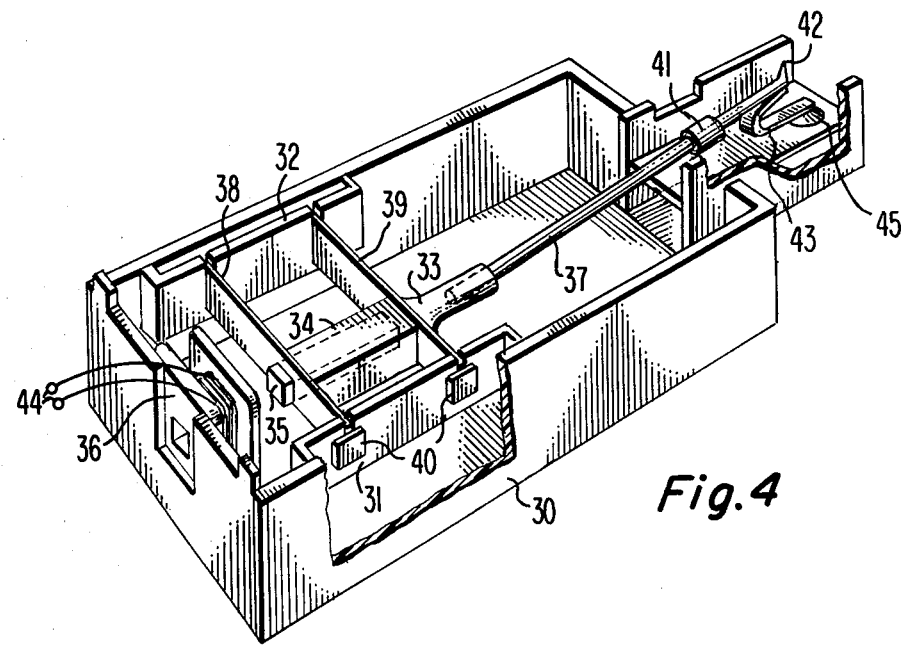
Figure 5:
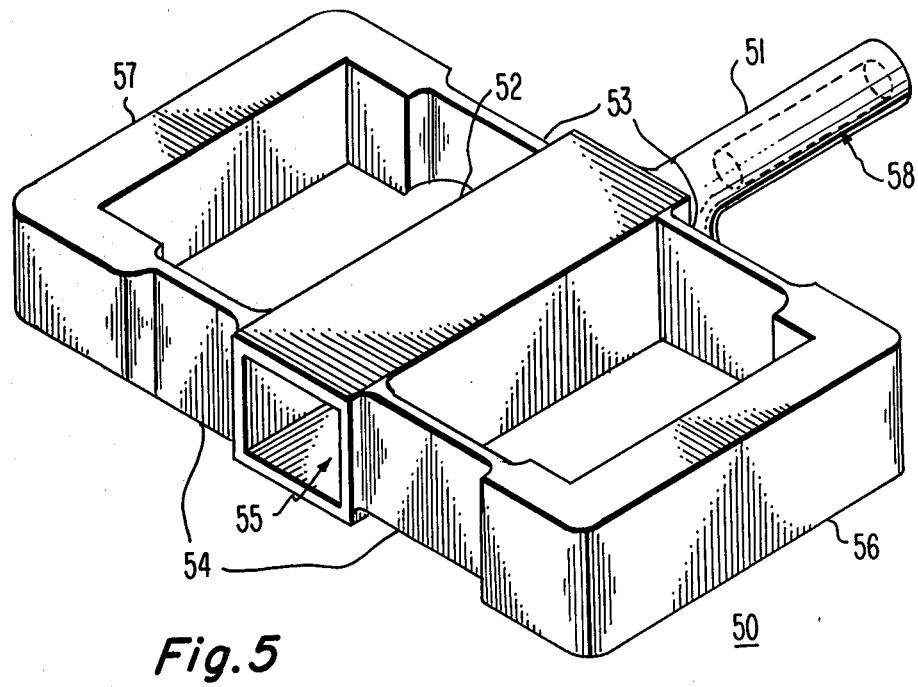

FIG. 3 (a) and (b) are pictorial representations of the force vectors imparted to a magnet mounted on the stylus arm by a fixed magnetic coil for the stylus arm under different flexure conditions;

FIG. 4 is a perspective illustration of a video disc stylus cartridge including a stylus arm suspension embodying the present invention; and FIG. 5 is a perspective illustration of a unitary molded stylus arm suspension element.

DETAILED DESCRIPTION OF THE INVENTION

Figure 1:
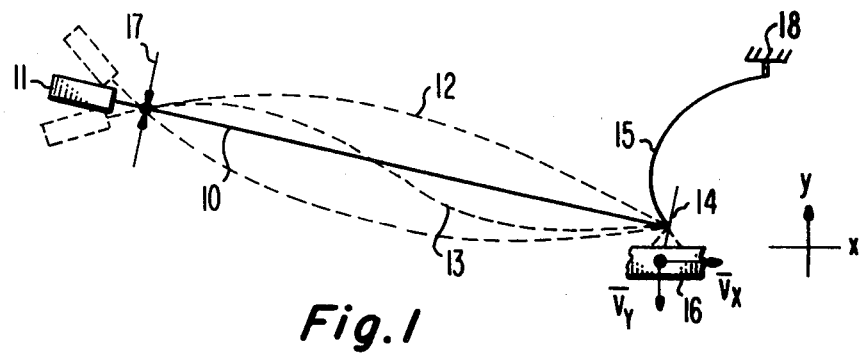
FIG. 1 is a schematic representation of a video disc stylus arm assembly in a fishpoling flexure condition.

In FIG. 1 a signal recovery stylus 14, secured to a generally rigid stylus arm 10, engages a disc record 16 for recovery of recorded signal therefrom. A positive pressure is maintained between the disc 16 and the stylus by a leafspring 15 connected between the stylus arm and a support structure 18. The stylus arm is supported at a point 17 near a second end distant from the signal recovery stylus, which support permits longitudinal motion of the stylus arm to allow for mechanical velocity correction, and pivotal motion of the stylus arm to allow the stylus to track warped and eccentric discs, etc. A permanent magnet 11 is secured to the second end of the stylus arm as part of a velocity correction transducer.

Signal recovery requires that relative velocity be established between the disc 16 and the stylus 14 which velocity is designated by the vector $\overline{V}_x$. Velocity correction or compensation is performed by imparting prescribed motion to the stylus arm in the x direction. Velocity $\overline{V}_x$ is produced by rotating the record. The rotation also tends to impart a vertical component of motion or velocity $\overline{V}_y$ to the stylus due to warpage, pressing defects, etc., in the disc or turntable. Since the stylus arm is not absolutely rigid, it tends to flex or fishpole when the stylus moves vertically as indicated by the broken lines 12 and 13. Broken line 12 is the fundamental mode of flexure and line 13 the first harmonic mode. These modes tend to resonate when the vertical force at the ends are applied at particular frequencies. Note that as the stylus arm bows out, the end having the magnet secured thereto pivots about the support point 17. Similarly, if a vertical force is applied to the magnet, the stylus arm will rotate about support 17, causing it to flex due to the stylus being constrained not to leave the disc surface by the leafspring 15.

It will be appreciated that bowing due to vertical translation of the stylus may be substantially eliminated by increasing the rigidity of the stylus arm since the bowing is the result of mass distribution over a longitudinal element and the pivot point is distant from the stylus. Bowing or flexure due to forces on the magnet, normal to the longitudinal axis of the stylus arm, is not so readily eliminated without significant increase in the stylus arm mass and consequent undesirable reduction in the frequency response of the velocity correction system. It should be noted that flexure due to normal forces on the magnet arises because the normal force is operating on a longitudinal member rotating about a fulcrum 17 with its distal end restrained from moving vertically. Regardless of whether the vertical translations of the stylus create stylus arm bowing, these translations will cause off axis misalignment of the magnet with its driving coil and subsequent normal force on the magnet will produce stylus arm flexure (FIG. 3a).

Figure 2:
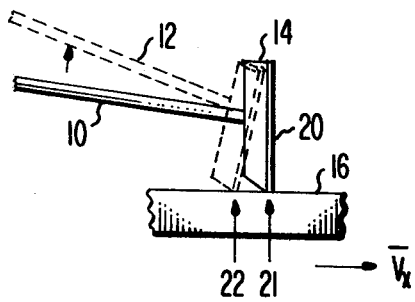
FIG. 2 is a schematic illustration of longitudinal stylus translation on the disc record resulting from stylus arm flexure.

Flexure of the stylus arm creates stylus disc velocity errors $\Delta \overline{V}_x$, first because the flexure effectively shortens the stylus arm when in the arched condition and second because the stylus rotates, see FIG. 2. As the stylus arm is effectively shortened the stylus 14 and the signal recovery electrode 20 thereon, is dragged leftward increasing the relative velocity $\overline{V}_x$. In addition, if the stylus is rigidly secured to the stylus arm and the stylus arm flexure is manifested by a bowing upward (broken line 12), the stylus is seen to rotate about its mounting point in a clockwise sense, translating the signal recovery electrode 20 further leftward, thereby further increasing the relative velocity. Conversely, if the stylus arm flexure causes a downward bowing, the stylus rotates counterclockwise and cancels a portion of the relative stylus-disc velocity change due to the effective stylus arm shortening. It is readily apparent that velocity changes due to stylus arm flexure create complicated velocity patterns and may cause signal recovery distortion.

An examination of FIGS. 3(a) and (b) shows how a coaxial magnetic velocity correction transducer can compound the flexure problem. In the drawing, coil 25 is secured to the support structure 18 (not shown) in which stylus arm 10 is suspended. Application of a current to the terminals 26 generates a magnetic field along the axis of the coil, and the coil is so positioned that the magnetic field will impart a force to the permanent magnet 11. For the condition that the coil 25, magnet 11 and stylus arm 10 are coaxially aligned, the force vector $\overline{F}$ will be coaxial with the stylus arm and impart only longitudinal motion thereto. However, if the interpolar axis of the magnet is misaligned from the coil axis due to stylus arm flexure, e.g., from the stylus tracking a warped disc, there will exist a component of force $\overline{F}n$ between the coil and magnet which acts normal to the longitudinal axis of the stylus arm. Note that if the flexure causes the magnet to move upward, or downward, the relative stylus-disc velocity being increased will cause the coil to respond by producing a magnetic field to move the stylus/stylus arm rightward and the normal component of force Fn will be in a direction to further enhance the undesired flexure. The resonance response is out of phase with the velocity correction signal and the system may oscillate.

FIG. 3(b) illustrates the situation where the stylus-magnet axis is parallel with the coil axis but misaligned. It is evident that under all conditions, whether the stylus arm is fishpoling or not, excitation by the coil will produce a force $\overline{F}n$ normal to the stylus arm axis and tend to create fishpole action.

Having discovered the particular problem, the present inventor developed the stylus arm-magnet suspension shown in FIG. 4. The suspension is illustrated mounted in a cartridge 30 to be removably secured in a carriage assembly, but the suspension is equally adaptable to direct mounting within the carriage (not shown). The suspension constrains the permanent magnet 35 portion of the velocity correction transducer in constant axial alignment with a fixed coil assembly 36. Thus, all forces imparted to the coil are axially aligned therewith, thereby considerably reducing the stylus arm flexure and enhancing velocity control.

Referring to FIG. 4, suspension support elements 31 and 32 are rigid and integral to the cartridge enclosure 30. Two parallel ribbon members 38 and 39 comprising a flexible material such as butyl rubber are lightly stretched between the support members. The ribbons are located and oriented by insertion in respective slots in the support members and restrained from passing through by end sections 40 respectively integral to the ribbons. A central element 34 is secured midway between the support elements 31 and 32 to the ribbons 38 and 39. The central element has a cavity for reception of a longitudinal permanent magnet 35. Magnet 35 is fixedly secured within the central element with its interpolar axis substantially normal to the planes formed by the flat surfaces of the ribbons and with its rear or left most pole preferably extending beyond ribbon 38. A magnetic field producing coil 36, responsive to velocity correction signal applied to signal input terminals 44, is coaxially aligned with the interpolar axis of magnet 35 and fixedly secured to the cartridge 30 or alternatively secured to the carriage assembly (not shown) into which the cartridge 30 is received.

A compliant coupler 33 is secured to the front or right most face of ribbon 39. Compliant coupler 33 has a cavity in its rightmost end for receivably securing therein longitudinal stylus arm 37 so that the stylus arm is in substantial coaxial alignment with the interpolar axis of the magnet 35 when in the nominal play position. Affixed to the rightmost end of stylus arm 37 is a holder 41 to which the signal recovery stylus 42 is attached. A leafspring flylead 43 is connected between the stylus holder 42 and a flylead post 45 affixed to the cartridge 30.

Compliant coupler 33 permits the stylus arm 37 to pivot thereabout precluding axial misalignment of the magnet 35 with the coil 36 due to vertical translations of the stylus during record playback.

Certain video disc players incorporate stylus deflectors for producing selective stylus translation radially across the disc record, i.e., track skippers. And certain of these skippers produce the stylus deflection by gradually twisting the stylus arm against its compliant coupling, then releasing it so that the energy stored in the coupling creates an abrupt counter rotation. Because the center of mass of the stylus/stylus arm system is substantially on the longitudinal axis of the stylus arm and above the record, the tip of the stylus engaging the record is displaced laterally by the counter rotation, e.g., see U.S. Pat. No. 4,183,059, Palmer. In such a system the compliant coupling 33 must be capable of elastically twisting to produce the desired counter rotation. It is desirable, however, that the twisting be decoupled from the center element 34 so that the mass of the magnet does not contribute to the twisting inertia of the stylus arm. The decoupling in the arrangement shown in FIG. 4 is provided by the interposition of ribbon 39 between the coupler 33 and the central element 34.

The FIG. 4 suspension arrangement has several advantageous aspects. First, compliant coupler 33, e.g., butyl rubber, tends to damp stylus arm oscillations reducing mechanical resonances. Second, the point of suspension of the stylus arm 37 in the carriage is coincident with the point at which velocity correction forces are applied, eliminating the fulcrum about which velocity correction forces may induce stylus arm flexure. Thirdly, off axis forces developed on the magnet 35 resulting from coaxial misalignment with the coil 36 during assembly are not detrimentally translated to the stylus arm.

FIG. 5 is a variation of the FIG. 4 stylus arm suspension molded as a unitary element 50. First and second ribbon elements 53 and 54 are molded integral with a center section 52 and compliant stylus arm coupler 51. Coupler 51 has a cavity 58 for receiving a stylus arm and center section 52 has a cavity 55 therein for receiving a magnet. The ends of the ribbons 53 and 54 are joined by end sections 56 and 57 having respective inner surfaces for engaging support elements in a cartridge or carriage assembly with the ribbons constrained with a prescribed degree of tensil stress. The end sections are shown to be generally rectangular but may be of alternate shape, e.g., half cylinders, so long as they provide the desired alignment of the ribbons when mounted in the cartridge structure. The entire unitary suspension is comprised of a generally compliant material such as butyl rubber.

What is claimed is:

1. In a video disc playback apparatus of the type having a base for rotatably supporting a disc record from which recorded information is recovered by a track following signal pickup stylus when relative velocity is established therebetween, said relative velocity being subject to undesirable variations, the combination comprising:
    a carriage mechanism for supporting and translating said signal pickup stylus radially across the disc record;
    a longitudinal stylus arm having said signal pickup stylus secured to a first end thereof and having a second end;
    a permanent magnet;
    a stylus arm suspension means having a first cavity for receiving and compliantly securing said second end of the longitudinal stylus arm thereto, having a second cavity for receiving said permanent magnet in a prescribed orientation relative to said stylus arm and having at least one elastic ribbon-like extension arranged substantially normal to the axis of said first cavity on each of opposite sides of said axis;
    means for securing said elastic ribbons in said carriage assembly so that said ribbons are in a prescribed condition of elastic tensile stress and arranged so the stylus will engage the disc record, said ribbons permitting limited motion of the stylus arm along its longitudinal axis;
    an electromagnetic coil having signal input terminals;
    means for securing said electromagnetic coil in the carriage mechanism aligned with the permanent magnet in a manner to produce forces on the permanent magnet directed along the longitudinal axis of the stylus arm when velocity correction signals are applied to said signal input terminals.

2. The combination set forth in claim 1 further including a leafspring secured between the stylus arm proximate said first end thereof and said carriage mechanism.

3. The combination set forth in claim 1 wherein the elastic ribbons of said stylus suspension means comprise a pair of parallel ribbons and said second cavity is located in a central element secured between said ribbons.

4. In a video disc player having a base for rotatably supporting a disc record from which recorded signal is recovered by a track following signal pickup stylus mounted to a longitudinal stylus arm and having a carriage for supporting and radially translating said signal pickup stylus/stylus arm assembly across the disc record and wherein signal recovery is effected when relative velocity is established between the signal pickup stylus and the disc record, said relative velocity being subject to undesirable variations, the combination comprising:

first and second elastic ribbon-like elements supported under tension in said carriage, said ribbon-like elements being displaced from each other in a direction along the longitudinal axis of the stylus arm and having their respective flat surfaces in parallel arrangement;

a permanent magnet;

means securing the permanent magnet between said ribbon-like elements;

an electromagnet having input terminals for applying velocity correction signals thereto, said electromagnet secured to the carriage and positioned to impart force to the permanent magnet in a direction coaxial with a line substantially normal to said parallel ribbons when velocity correction signal is applied to said input terminals;

a compliant coupler having a cavity therein for receiving and securing an end of the stylus arm distant from said pickup stylus, said coupler fixed to the ribbon element most distant from the electromagnet and permitting engagement of the pickup stylus with the disc record when said video disc player is conditioned for signal recovery and wherein the longitudinal axis of the stylus arm is substantially colinear with the vector force imparted to said permanent magnet by magnetic fields generated by said electromagnet for correcting undesirable relative stylus-disc velocity variations.

5. The combination set forth in claim 1 or 4 wherein the interpolar axis of the permanent magnet is oriented sunstantially colinear with the longitudinal axis of the stylus arm.

6. The combination set forth in claim 5 wherein one pole of the permanent magnet extends beyond the ribbon element located most distant from the stylus arm to a position proximate the electromagnet for effecting coupling with magnetic fields generated responsive to velocity correction signals.

7. The combination set forth in claim 4 further comprising a leafspring connected in an elastic arc of deformation between the stylus arm at a point proximate the signal pickup stylus and the carriage.

8. A video disc signal pickup stylus cartridge comprising:

a longitudinal stylus arm having a signal recovery stylus secured to a first end thereof and having a second end;

a casing having walls defining a protective enclosure for the stylus arm unit, the casing having an aperture through which the pickup stylus may protrude;

a leafspring flylead connected in an elastic arc of deformation between the stylus arm proximate its first end and the casing, said leafspring tending to expel the stylus through said aperture;

first and second elastic ribbon-like elements secured in tension in parallel fashion within the enclosure distant from the pickup stylus;

a longitudinal permanent magnet having a longitudinal interpolar axis;

a central element secured between the parallel ribbon-like elements, said central element having a cavity therein for receiving said permanent magnet;

a compliant coupling having a cavity therein for receiving the second end of the stylus arm, said compliant coupling secured to one of said ribbon elements so that the interpolar axis of the permanent magnet is substantially colinear with the longitudinal axis of the stylus arm when the pickup stylus is conditioned for engagement with a disc record for signal recovery.

9. The cartridge set forth in claim 8 wherein the first and second ribbon elements, and the central element, and the compliant coupling are molded in a single unitary structure from a compliant material, wherein the ribbon elements and the central elements respectively form the legs and crossmember of an "H" shaped structure with the compliant coupling being an extension of the crossmember beyond one leg ribbon.

10. The cartridge set forth in claim 8 wherein the compliant coupler comprises a material capable of being elastically twisted about the longitudinal axis of the stylus arm.

11. The cartridge set forth in claim 10 wherein the compliant coupler comprises a material capable of being elastically twisted about the longitudinal axis of the stylus arm, the restoring force of said twisted material rotating the stylus arm to cause a translation of the signal pickup stylus in a direction radially across a disc record when the cartridge is employed in a video disc player for signal recovery.

12. The cartridge set forth in claims 10 or 11 wherein the compliant coupler is effectively decoupled from the central element so that a twisting of the stylus arm will not effectuate a twisting of the permanent magnet.

13. A molded unitary stylus arm suspension element for securing a video disc stylus/stylus arm assembly in a stylus cartridge comprising:

first and second parallel ribbon-like elements, each having respective first and second ends;

first and second end connecting elements for respectively connecting the first ends of the ribbon elements and the second ends of the ribbon elements respectively, said end connecting elements maintaining the ribbon elements in parallel configuration;

a central element located midway between the first and second ribbon elements and secured to both ribbon elements, said central element having a cavity therein for receiving a permanent magnet in a prescribed orientation, said cavity having an opening on one end of said central element which opening is formed through one of said ribbon elements;

a coupling element having a cavity therein for receiving one end of said stylus arm, said coupling being located substantially colinear with the central element and opposite the central element cavity opening and wherein the axis of the coupling cavity is substantially colinear with an interribbon axis of the central element cavity; and wherein the unitary suspension element comprises a compliant elastic material.

* * * * *